Patented Nov. 7, 1933

1,934,221

UNITED STATES PATENT OFFICE 1,934,221

MANUFACTURE OF 2-METHYL-BENZANTHRONE

Alexander J. Wuertz, South Milwaukee, Wis., assignor to E. I. du Pont de Nemours & Company, Wilmington, Del., a corporation of Delaware No Drawing. Application July 2, 1932
Serial No. 620,729

8 Claims. (Cl. 260—61)

This invention relates to the manufacture of organic compounds. More particularly, it deals with an improved process for purifying and isolating 2-methyl-benzanthrone.

2-methyl-benzanthrone is generally produced by reacting 2-methyl-anthraquinone with a reducing agent and glycerine, according to the well known Scholl synthesis of benzanthrone compounds. According to a recent modification of said process, as described, for instance, in my U. S. Patent No. 1,896,147, the reduction of the anthraquinone body and its condensation with glycerine may proceed simultaneously. In either case the reaction product consists of three or four isomers, among which 2-methyl-benzanthrone occurs in leading proportions, but is by no means predominating. From a technical viewpoint, the 2-methyl isomer is the only one which has a practical value. It becomes necessary, therefore, to isolate said compound from the remaining isomers, before it can be applied to advantage in the art.

Such isolation has already been performed in the art. It involves generally the fractional recrystallization of the reaction product from an organic solvent, such as alcohol, benzene, or nitrobenzene. 2-methyl-benzanthrone is less soluble in these solvents than its isomers, and is the first to crystallize out as the solution cools.

Now I have observed that unless the recrystallization is repeated a commercially prohibitive number of times, the 2-methyl-benzanthrone isolated as above is not of a satisfactory degree of purity for the manufacture of dyestuffs therefrom. I have also found that the purity of the product can be considerably increased by extracting it with strong alkalis such as caustic soda or soda ash. I have further found that the purification treatment may be very advantageously combined with the isolation treatment, whereby to isolate a highly pure 2-methyl-benzanthrone from the crude reaction product in a highly efficient and economical manner as more fully described below.

It is accordingly an object of this invention to provide a process for producing 2-methyl-benzanthrone in a state of high purity.

It is a further object of this invention to provide a process for recovering 2-methyl-benzanthrone from its crude reaction mass in a state of high purity and substantially free of isomers.

It is a further object of this invention to provide a process for purifying 2-methyl-benzanthrone which may be combined with the step of separating the same from its isomer, whereby to effect both purification and separation in a highly efficient and economical manner, satisfying the requisites of large scale manufacture.

Other and further important objects of this invention will appear as the description proceeds.

According to my invention, the crude methyl-benzanthrone product obtained by drowning in water and filtering the reaction mass obtained by condensing reduced 2-methyl-anthraquinone with glycerine is dissolved in an organic solvent, such as benzene or nitrobenzene, and heated with an alkaline agent such as caustic soda or soda ash. This agent is preferably added solid, in the form of a powder. By this treatment, certain of the impurities in the crude methyl benzanthrone which are reactive toward alkalis form salts or compounds which are not soluble in the organic solvent. These insoluble impurities, together with whatever excess of alkali there was used, are filtered off hot. The mother liquors are then allowed to cool, whereby 2-methyl-benzanthrone crystallizes out in a state of high purity.

Since the above treatment involves eventually the filtering off of the precipitated impurities from the hot solution of methyl-benzanthrone, I find it advantageous to effect the alkaline extraction in the presence of charcoal, bone black or other similar decolorizing and filtering assistant.

As for the quantities of soda ash and charcoal required, these clearly may vary within wide limits. Since sodium carbonate and charcoal are insoluble in organic solvents such as benzene or toluene, there is no harm in adding an excess, because such excess would be eliminated in the filtration step. In large scale manufacture, it is advantageous for the purpose of economy to carry out a test on a small sample to determine the optimum quantity of soda ash or charcoal required. The purifying effect of a given proportion of soda ash or charcoal on the benzanthrone mass may be estimated by taking the melting point of the resulting 2-methyl-benzanthrone or by converting said 2-methyl-benzanthrone into a dyestuff such as that described in U. S. Patent No. 1,044,797, and comparing its dyeings upon cotton with a standard.

2-methyl-benzanthrone purified by my novel procedure has a melting point of 193–200° C., which is comparable to that of the purest product produced by repeated recrystallization from alcohol. When converted into dyestuffs, such as the one mentioned above, it gives a highly pure dyestuff dyeing cotton, in bright and true shades characteristic of the particular color.

Without limiting my invention to any particular procedure, the following example in which parts by weight are given, will serve to illustrate my preferred mode of operation.

*Example*

110 parts of crude beta-methyl-benzanthrone, as obtained, for instance, by simultaneously reacting 2-methyl-anthraquinone with iron and glycerine in a sulfuric acid medium at a temperature of about 110 to 120° C., and then drowning the mass in water and recovering the precipitate, are suspended in 300 parts of solvent naphtha (technical). To this suspension 40-50 parts of soda ash (anhydrous) and 10 parts of charcoal or bone black powder are added, and the whole mass is heated under reflux for a period of 1 to 2 hours. The charge is then cooled to about 120 to 100° C. and filtered. The residual cake, consisting of bone-black (or charcoal), soda ash and certain impurities precipitated by the soda ash, is washed with a small quantity of solvent naphtha, and the washings added to the main filtrate. The combined filtrates are then allowed to cool to about 15 to 25° C. At this point, 2-methyl-benzanthrone crystallizes out in well defined crystals and is filtered off, washed successively with cold solvent naphtha and alcohol, and dried. The product thus obtained has a melting range of 198-200° C. and is highly suitable for the manufacture of dyestuffs.

It will be understood that many variations and modifications are possible in my preferred procedure without departing from the spirit of this invention. Thus, although I preferred to use solvent naphtha as suspending medium in view of its low solvent action on 2-methyl-benzanthrone, other inert organic solvents may be used to great advantage, for instance, toluene, xylene, mono-chloro-benzene, dichlorobenzene. Again, while I specified soda ash as the precipitant, any other alkaline substance which is insoluble in the organic solvent employed may be used. Additional examples of such alkaline substances are lime, magnesia or barium hydrate. Similarly, while I preferred to use a decolorizing agent of the charcoal family, other decolorizing agents or filtering assistants may be used; for instance, fuller's earth. Other variations and modifications are possible, as will be readily understood to those skilled in the art.

In the claims below it should be understood that by the expression "decolorizing agent of the charcoal family" I am referring to such agents as charcoal, bone black or activated carbon, which are generally used as decolorizing agents and filtering assistants.

I claim:

1. A process of recovering 2-methyl-benzanthrone from a crude mixture thereof with isomers, which comprises precipitating alkali-reactive impurities from a solution of said crude mass in an organic solvent by means of an alkali, separating the alkali and the precipitated impurities from the organic solution, and crystallizing out 2-methyl-benzanthrone from said organic solution.

2. A process of recovering 2-methyl-benzanthrone from a crude mixture thereof with isomers, which comprises heating said crude mass in an organic solvent in the presence of an alkali, filtering off the insoluble matter, and crystallizing out 2-methyl-benzanthrone from the filtrate.

3. A process of recovering 2-methyl-benzanthrone from a crude mixture thereof with isomers, which comprises heating said crude mass in an organic solvent in the presence of an alkali and a decolorizing agent, filtering off the insoluble matter, and crystallizing out 2-methyl-benzanthrone from the filtrate.

4. A process of recovering 2-methyl-benzanthrone from a crude mixture thereof with isomers, which comprises heating said crude mass in an organic solvent in the presence of an alkali-metal carbonate and a decolorizing agent of the charcoal family, filtering off the insoluble matter, and crystallizing out 2-methyl-benzanthrone from the filtrate.

5. A process of recovering 2-methyl-benzanthrone from a crude mixture thereof with isomers as obtained in the synthesis of said compound from 2-methyl-anthraquinone and glycerine, which comprises heating said crude mass in an organic solvent in the presence of soda ash and charcoal, filtering off the insoluble matter while the mixture is hot, and cooling the filtrates to crystallize out 2-methyl-benzanthrone.

6. In the process of separating 2-methyl-benzanthrone from isomers by fractional crystallization from an organic solvent, the step which comprises extracting the solution of beta-methyl-benzanthrones in the organic solvent, prior to crystallization, with an alkali, and removing the matter which is insoluble in the organic solvent.

7. In the process of separating 2-methyl-benzanthrone from isomers by fractional crystallization from an organic solvent, the step which comprises heating a solution of crude beta-methyl-benzanthrone in an organic solvent with an alkali and a decolorizing agent of the charcoal family, and filtering off the insoluble matter prior to crystallization of the 2-methyl isomer.

8. A process of recovering 2-methyl-benzanthrone from a crude mixture thereof with isomers as obtained in the synthesis of said compound from 2-methyl-anthraquinone and glycerine, which comprises refluxing a solution of said crude mass, in solvent naphtha in the presence of soda ash and charcoal, cooling to about 120-100° C., filtering off the insoluble matter, and cooling the filtrates to below 25° C., to crystallize out 2-methyl-benzanthrone.

ALEXANDER J. WUERTZ.